T. A. COLE.
WHEEL-HARROW.

No. 169,623.　　　　　　　　　Patented Nov. 9, 1875.

Witnesses:　　　　　　　　　　Inventor.
　　　　　　　　　　　　　　　Thomas A. Cole.
　　　　　　　　　　　　Per.
　　　　　　　　　　　　　　　Atty.

UNITED STATES PATENT OFFICE.

THOMAS A. COLE, OF TRAFALGAR, INDIANA.

IMPROVEMENT IN WHEEL-HARROWS.

Specification forming part of Letters Patent No. 169,623, dated November 9, 1875; application filed August 6, 1875.

*To all whom it may concern:*

Be it known that I, THOMAS A. COLE, of Trafalgar, Johnson county, State of Indiana, have invented a new and useful Improvement in Sod-Cutters and Harrows, of which the following is a specification, reference being had to the accompanying drawings.

My invention consists in the form of the harrow-frame, the manner of securing the teeth or sod-cutters to the frame, and the manner of attaching the harrow to the vehicle-frame, so that it can be adjusted up and down with a swinging motion forward and back, and prevented from any lateral motion at the front of the harrow.

Figure 1:
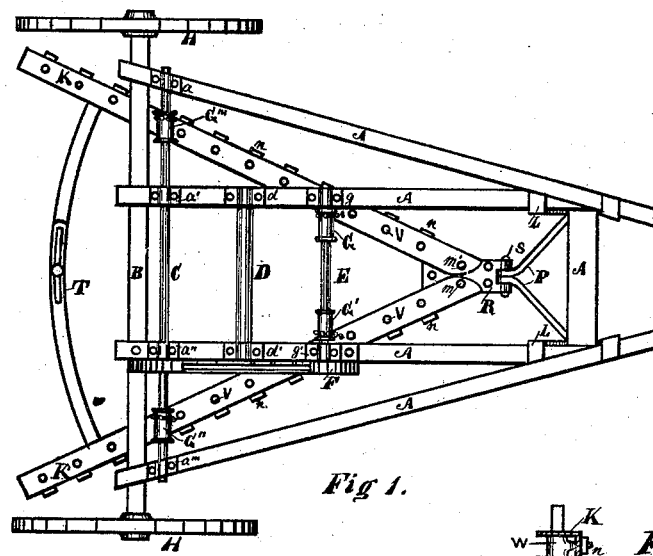
Figure 3:
Figure 2:
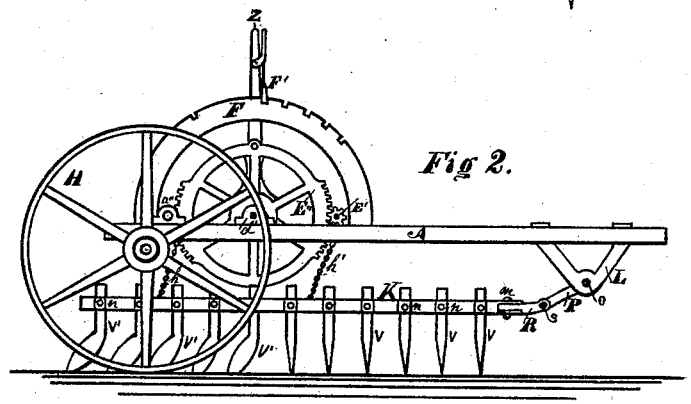

Figure 1 represents a plan view of my improved sod-cutter and harrow. Fig. 2 is a side elevation of the same. Fig. 3 is a cross-section of the harrow-frame, showing the manner in which the harrow-teeth and sod-cutters are secured thereto.

In the drawings, A represents the frame of the vehicle, on which, at the rear end, is secured the axle B, with the wheels H H. At the front end of the frame A, on each side, are attached the hangers L L, which are connected together by the shaft O. On this shaft are pivoted the front ends of the forked connecting-bars P, that are also attached to the hinged plate R at the front end of the harrow-frame K, so as to give a swinging motion to the harrow, forward and backward, and prevent any lateral motion thereto. The harrow-frame K is formed of iron bent into the shape of three sides of a square, as represented in the sectional view of Fig. 3. These frames are perforated with a number of holes to receive the harrow-teeth V and sod-cutters V'. These teeth are inserted into an eyebolt, W, and through the holes in the frame K K', and secured by the nut $n$. The frames K K' are pivoted to the front hinge-plate R at $m$ $m'$, and are made adjustable in width at the rear of the harrow by the adjusting-bar T, which is provided with a slot and bolt for that purpose. At the rear of the vehicle-frame A A, and extending across from side to side, is a shaft, C, working in bearings $a$ $a'$ $a''$ $a'''$. On this shaft are two pulleys, $G''$ $G'''$, and in front of this shaft is another shaft, E, also provided with pulleys G G'. To each of these pulleys is attached one end of a chain, $h$ $h'$, which extends downward, and is secured to the harrow-frame K K'. Between the shafts C and E is another shaft, D, on one end of which is attached the rack-wheel $E''$, having cogs or racks on two opposite sides, to mesh in gear with the small pinion $E'$ on the shaft E, and a duplicate pinion on the shaft C. (Not shown.) The wheel $E''$ is also provided with a lever, Z, having a snap-catch, $F'$, that secures the lever in any position required on the quadrant F. When the lever Z is in the position shown in Fig. 2 the harrow-frame is elevated and the chains $h$ $h'$ are wound around the pulleys G $G'$ $G''$ $G'''$. If the lever Z is then thrown forward the chains $h$ $h'$ are unwound from the pulleys G $G'$ $G''$ $G'''$, and the harrow-frame is lowered, its height being determined by the position which the lever Z occupies on the quadrant F.

If necessary, a bearing-wheel can be placed on the shaft O at the front of the vehicle-frame A, to prevent the frame from dragging on the ground.

What I claim as new, and wish to secure by Letters Patent, is—

1. The side frames K K of the harrow, constructed as shown, in combination with the teeth V, or sod-cutters V', eyebolt W, and nut $n$, constructed and operated substantially as and for the purpose hereinbefore set forth.

2. In combination with the harrow-frame K K', the hinged plate R, forked connecting-bars P, shaft O, and hangers or bearings L L, constructed and operated substantially as and for the purpose hereinbefore set forth.

3. In combination with the vehicle-frame A, the shafts C and E, provided with pulleys G $G'$ $G''$ $G'''$ and pinions $E'$, and operated by the rack-wheel $E''$, lever Z, and quadrant F, to raise and lower the harrow-frame K K', substantially as and for the purpose hereinbefore set forth.

In testimony whereof I have signed my name to this specification in the presence of two subscribing witnesses.

THOMAS A. COLE.

Witnesses:
HENRY W. CALDWELL,
JEROME STALEY.